Jan. 9, 1951 L. R. APARICIO 2,537,011
VARIABLE FILTER SCREEN
Filed March 14, 1947 6 Sheets-Sheet 1

Jan. 9, 1951 L. R. APARICIO 2,537,011
VARIABLE FILTER SCREEN
Filed March 14, 1947 6 Sheets-Sheet 2
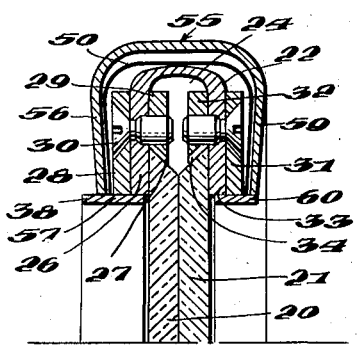
Fig. 2.
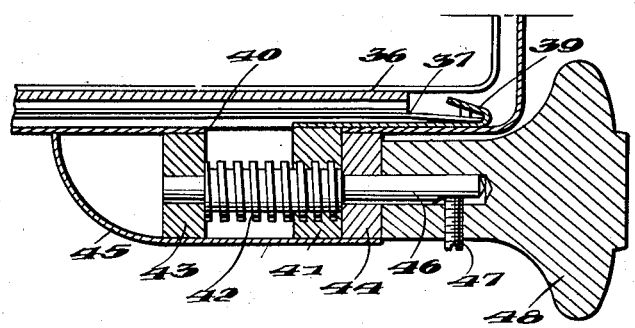
Fig. 4.
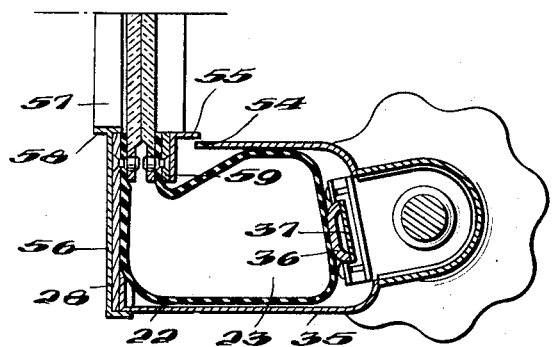
Fig. 3.
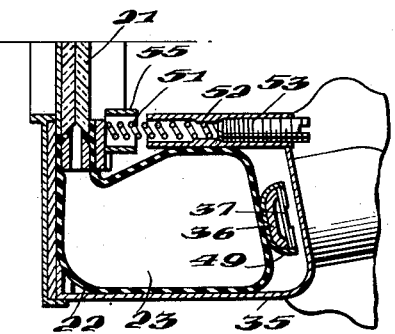
Fig. 5.
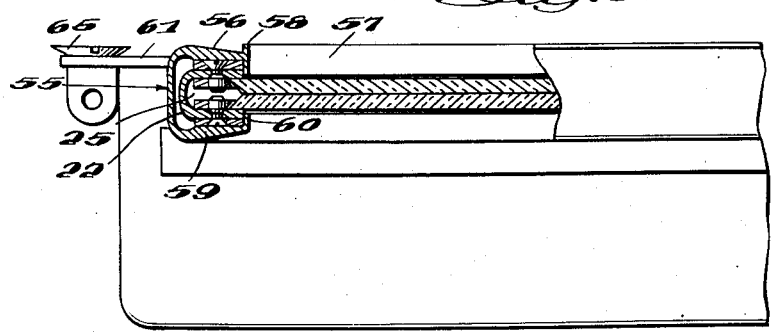
Fig. 6.
Fig. 7.
Inventor
L. R. APARICIO,
By Parry & Miller
Attorneys

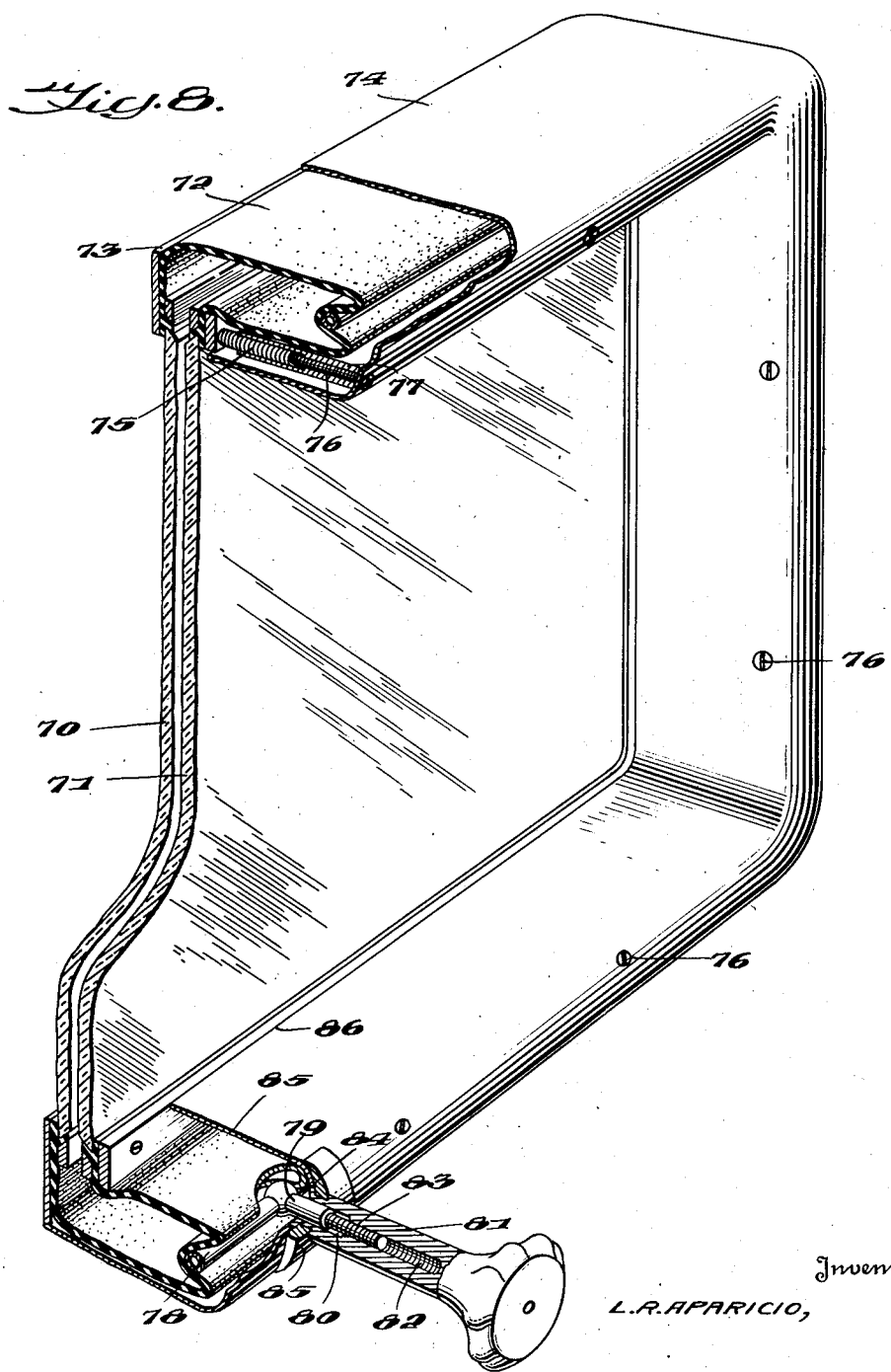

Jan. 9, 1951 L. R. APARICIO 2,537,011
VARIABLE FILTER SCREEN
Filed March 14, 1947 6 Sheets-Sheet 4
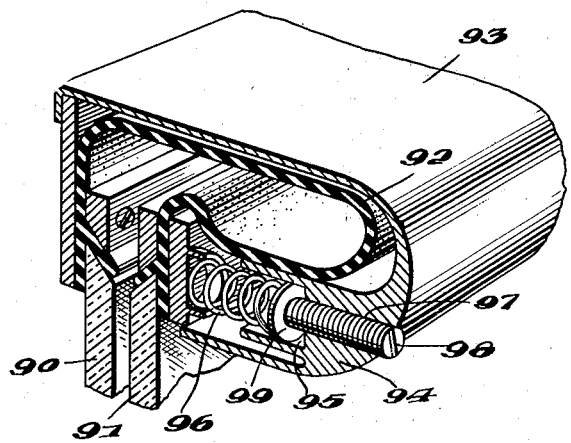
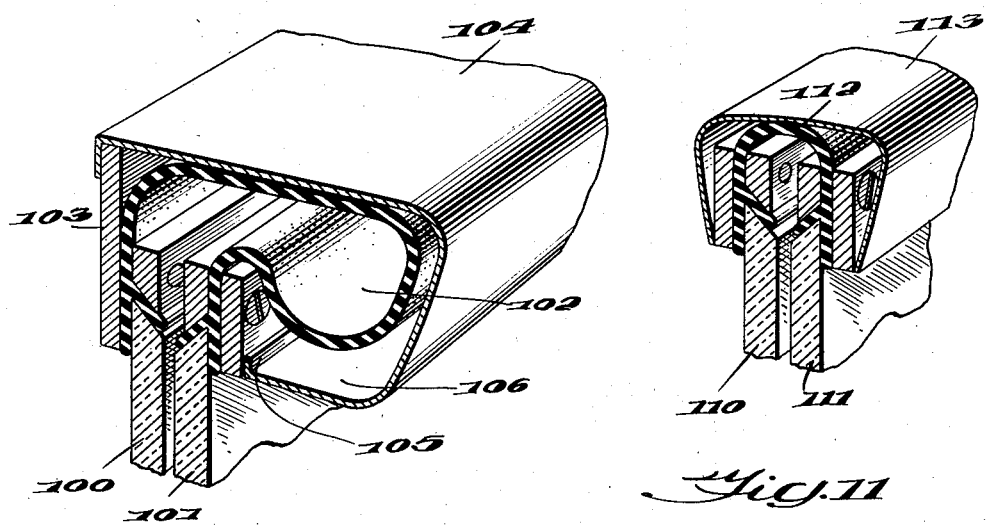
Inventor
L. R. APARICIO,
By Perry + Miller
Attorneys

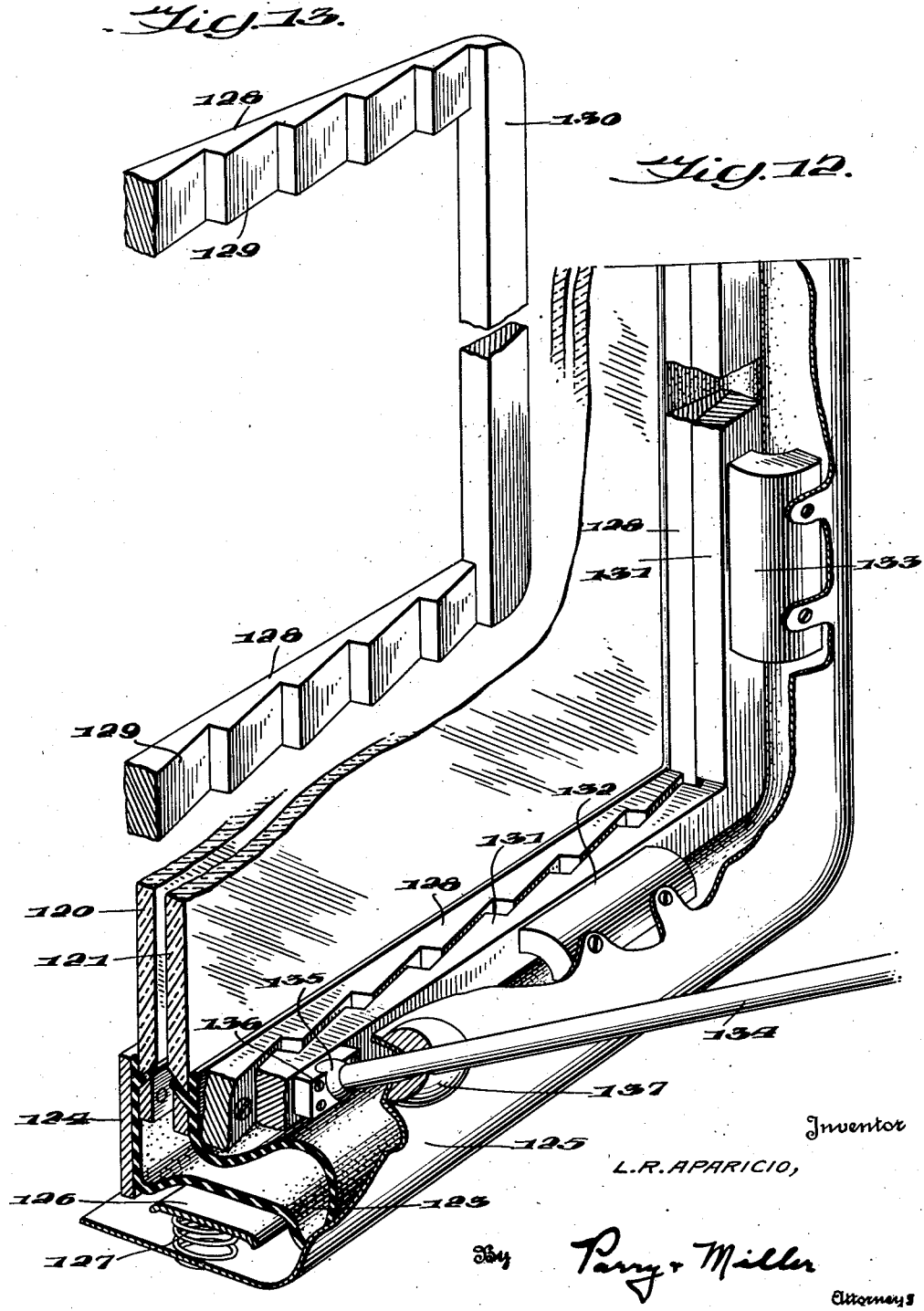

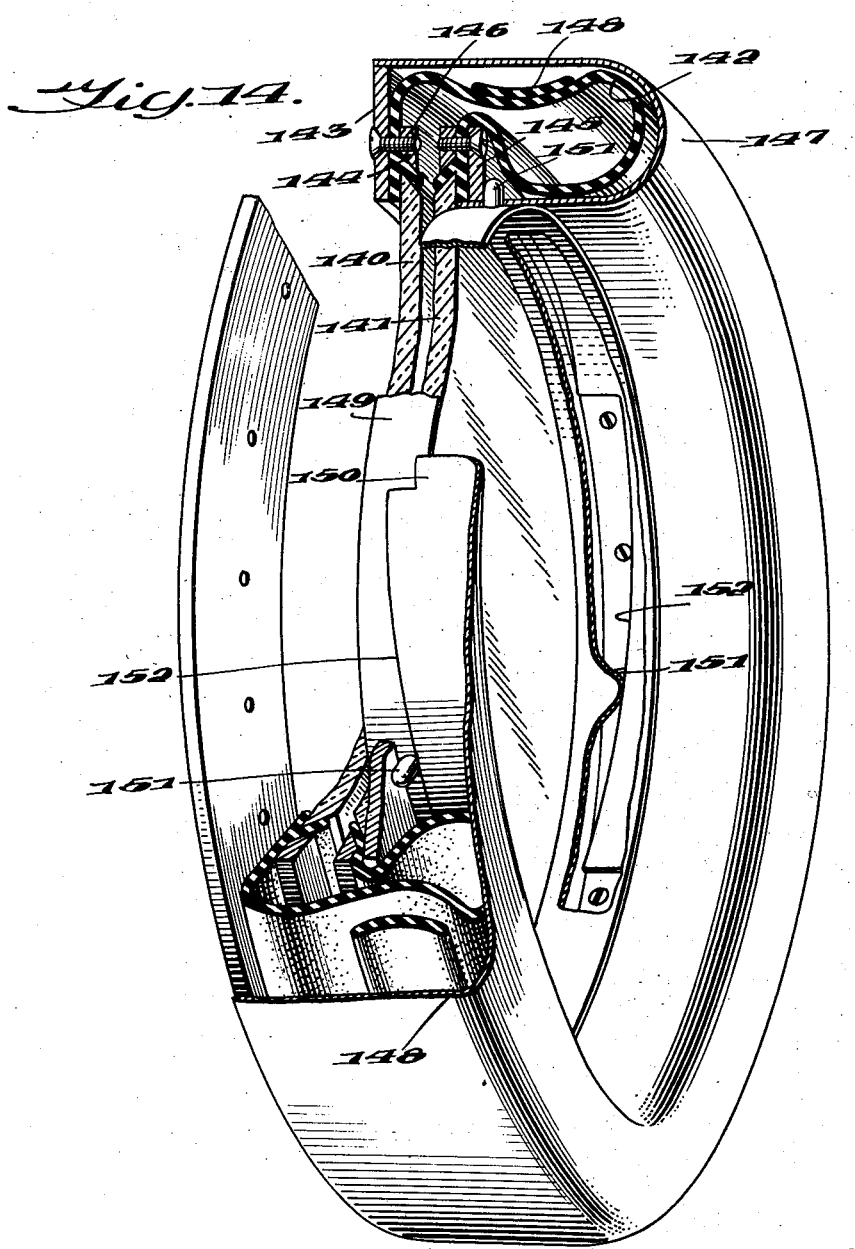

Patented Jan. 9, 1951

2,537,011

UNITED STATES PATENT OFFICE 2,537,011

VARIABLE FILTER SCREEN

Luis Rodriguez Aparicio, Madrid, Spain

Application March 14, 1947, Serial No. 734,790

20 Claims. (Cl. 88—60)

This invention relates to variable filter screens for regulating the transmission of light and other types of radiant energy, also corpuscular rays. Such a device is useful as a light glare screen for vehicles and airplanes and has many other uses hereafter referred to.

Ordinary filter screens have a fixed filtering action so that the intensity and/or the character of the light or other transmission cannot be varied. Also, such type of filter screens must be removed bodily from the path of transmission when no filtering action is desired.

A filter screen designed to overcome the objections of fixed filter screens by providing a variable filtering action is described and claimed in my copending application, S. N. 641,972, filed January 18, 1946, now Patent 2,474,712, granted June 28, 1949. Such device comprises opposing parallel rigid transparent members mounted for movement laterally to and from each other to receive a layer of varying thickness of a suitable gaseous or liquid filtering medium. The filter fluid is supplied from a deformable reservoir directly communicating with the margins of the transparent members. When the transparent members are in face to face contact the screen is clear. Compression of the reservoir forces filter fluid therefrom between the transparent members. By regulating the amount of pressure any desired thickness of filter layer may be introduced between the members. To insure uniform distribution and thickness of the filter layer both during and subsequent to adjustment the reservoir extends completely around the transparent members and filter medium is delivered from the reservoir simultaneously around the entire periphery of the members. Any desired degree of filtering action is thus obtained. Various types of colored gases and liquids may be employed for the filter medium depending upon the particular use to which the filter screen is to be put.

The present invention involves a variable filter screen of the same general character of my aforesaid prior patent application and involves improvements in construction and operation thereof.

One object of the present invention is to insure maintenance of the transparent members of a variable filter screen in parallel relation under all conditions of spacing so that the thickness of the filtering layer between them and the filtering action will be uniform throughout all areas of the screen.

Another object of the invention is to improve the construction of the filter medium reservoir of a variable filter screen.

A further object of the invention is to provide improved means for regulating the delivery of filter medium between the reservoir and the space between the transparent members of a variable filter screen.

Still another object of the invention is to provide improved actuating means for moving together from spaced position the transparent members of a variable filter screen.

Still another object of the invention is to provide improved forms of mounting for a variable filter screen of the character described.

The above and other objects, features and benefits of the invention will be understood from the various embodiments of my invention illustrated in the appended drawings and the detail description thereof to follow.

In the drawings:

Fig. 2 is an enlarged fragmentary cross-section of the upper portion of the filter screen shown in Fig. 1;

Fig. 3 is an enlarged fragmentary cross-section taken on the line 3—3 of Fig. 1;

Fig. 4 is an enlarged fragmentary longitudinal section taken on the line 4—4 of Fig. 1;

Fig. 5 is an enlarged fragmentary cross-section corresponding to Fig. 3 but taken on the line 5—5 of Fig. 1;

Fig. 6 is a fragmentary top plan view of the upper lefthand portion of the screen shown in Fig. 1, certain parts being broken away to show interior construction;

Fig. 7 is a fragmentary horizontal section taken approximately on the line 7—7 of Fig. 1;

Fig. 8 is a fragmentary perspective view of a second embodiment of filter screen according to the invention;

Fig. 9 is a fragmentary perspective view showing modification of certain details of construction of the embodiment of Fig. 8;

Figs. 10 and 11 are fragmentary views of two further embodiments of the invention;

Fig. 12 is a fragmentary perspective view of still another embodiment of the invention;

Fig. 13 is a perspective view of certain of the parts shown in Fig. 12; and

Fig. 14 is a fragmentary perspective view of still another embodiment of the invention.

Figure 1:
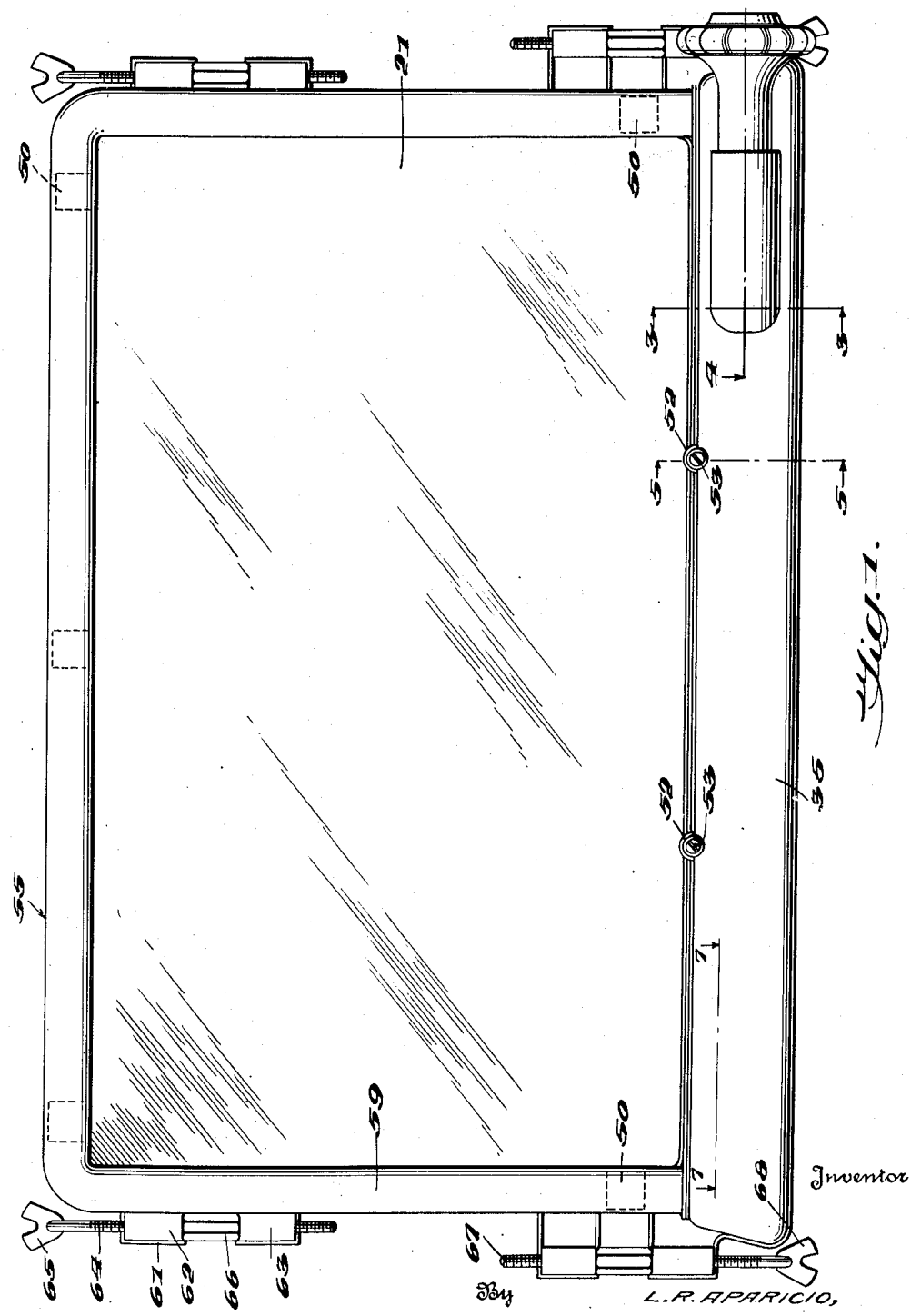
Fig. 1 is a rear elevation of a variable filter screen according to the invention.

The variable filter screen shown in Figs. 1 through 7 comprises two rigid transparent members 20 and 21 of glass, synthetic plastic or any other suitable transparent material having low inherent filtering characteristics, and having sufficient strength and thickness as not to warp or break when subject to moderate fluid pressure. Surrounding the margins of members 20 and 21 is a deformable, closed reservoir 22 of flexible, fluid-tight material. Such reservoir is preferably molded of rubber or suitable synthetic plastic as a one-piece unit and, as will be understood from Figs. 2, 3 and 6, extends continuously around the transparent members as a border. Along the lower side of members 20 and 21 reservoir 22 is of enlarged cross-section to provide a reservoir chamber 23 of substantial capacity so that sufficient filter medium may be stored therein to form a layer of substantial thickness between the sheets when delivered thereto from the reservoir. The chamber portions 24 and 25 along the top and opposite sides of the filter screen, respectively, are of substantially smaller cross-section and capacity and are able to supply filter medium from the top and side margins of the screen as rapidly as it is supplied at the bottom since all portions of the reservoir are in continuous communication.

As best shown in Fig. 2 the margins of transparent members 20 and 21 are beveled in an outward direction. The inner margins of the opposite side walls of reservoir 22 are bifurcated to provide outer and inner portions 26 and 27. Such bifurcated reservoir margins and the beveled margins of the transparent members are clamped in sealing engagement with each other and secured to frame member 28 by an inner clamping frame 29. Screw connecting elements 30 extend between frame member 28 and clamping member 29. It will be observed that clamping member 29 is beveled with the same inclination as the margin of member 21 so as to insure a reliable fluid-tight seal between the reservoir and the member, also that clamping member 29 is of less thickness than the transparent member so that the two transparent members may be brought into face to face contact.

On the exposed side of the second transparent member 21 is a rigid laterally movable frame 31 generally similar to frame 28. Through a clamping member 32 similar to member 29 the bifurcated marginal portions 33 and 34 of the reservoir 22 are clamped in sealing engagement with the beveled margin of transparent member 21.

The enlarged portion of reservoir 22 along the bottom of the filter screen is supported in a hollow rigid frame or housing 35. Engageable with the wall of chamber 23 is a rigid pressure bar 36 which extends substantially the full length of housing 35, as will be understood from Fig. 4. Movement of pressure bar 36 laterally forces the wall of reservoir chamber 23 inwardly to build up pressure in the filter fluid (not shown) contained in the entire reservoir, whereby the filter fluid is forced between transparent members 20 and 21 as they are caused to separate by the pressure of the fluid.

Actuation of pressure bar 36 is effected through a deformable spring steel strip 37 which is anchored at one end of housing 35 by means of a stationary anchoring clamp 38 fixed to the inner side of the wall of casing 35. The other end of strip 37 is received in a longitudinally movable clamping member 39 shown in Fig. 4. Member 39, through an opening 40 in the wall of housing 35 is connected with a longitudinal adjustable block 41 on a rotatable threaded member 42 journalled in stationary blocks 43 and 44 mounted in an auxiliary housing 45. Threaded member 42 has a reduced shaft portion 46 projecting outwardly beyond block 44, and secured thereto by a set screw 47 or by any other suitable means is an actuating knob 48. Rotation of the knob and threaded member 42 shifts member 39 longitudinally, resulting in bowing inwardly of spring member 37 against pressure bar 36. It is desirable that the arrangement of parts be such that pressure bar 36 can be moved laterally substantially completely across housing 35 until the opposite side walls of reservoir chamber 23 are brought almost together, it being understood that the greater the degree to which reservoir chamber 23 can be collapsed the greater the amount of filter fluid that can be forced between transparent members 20 and 21, and consequently the greater the filtering action of the screen. Actuating spring member 37 is secured to pressure bar 36 only in the central area thereof so that it may be free to bow relative to the pressure bar for substantial portions of its length adjacent opposite ends. Connection between members 37 and 36 may be effected by means of clamping elements 49, shown in Fig. 5.

Spring means are provided for returning transparent members 20 and 21 together from spaced relation when the pressure bar is retracted to permit fluid between sheets to return to the reservoir. Correctly speaking, upon the release of fluid pressure the spring means forces the liquid back into the reservoir. Such spring means include a series of spring metal clamps 50 arranged at recurrent intervals along the top and sides of the screen as indicated in Fig. 1, such spring clamps embracing and being welded or otherwise secured to frame members 28 and 31. As will be understood from Fig. 2 members 50 are of sufficient length to arch over reservoir 22 in such manner as not to constrict the reservoir.

The spring means provided along the lower side of the screen are of an adjustable type, it being important that the spring tension on the top and bottom of the transparent members be equalized in order to maintain parallelism of transparent members 20 and 21. Such adjustable spring means comprise a plurality of expansion springs 51 engageable with the movable frame portion of transparent member 21. As shown in Fig. 5 such springs are supported in tubular housings 52 secured to the top of housing 35. The outer portions of housings 52 are threaded to receive adjustment screws 53 by which the tension of springs 51 against the transparent member 21 is adjusted. As will be understood in Fig. 1 the adjustable springs, two or more, are mounted in equal number on opposite sides of the mid point of the screen so as to make it easier to equalize the tension along the bottom of transparent member 21 as well as equalizing the tension at the bottom with the tension provided by spring clamps 50, or compensate for accidental variation between the tension of the individual spring clamps 50.

As shown in Fig. 3 top wall 54 of rigid housing 35 terminates in an inner edge 54 sufficiently spaced from transparent member 21 and the parts associated with the lower margin thereof to provide clearance for lateral movement when filter medium forces transparent member 21 into spaced relation with member 20. The gap providing such clearance may be covered by a protective member 55 secured to and movable with the marginal parts of transparent member 21.

It will be understood that rigid housing 35 encases only the enlarged chamber portion 23 of reservoir 22 extending along the bottom of the filter screen. The sides and top of the reservoir and clamping springs 50 are also encased by a flexible channel-shaped housing 55 of molded rubber or other similar material as shown in Figs. 1, 2 and 6. The side wall 56 of such housing covers the whole face of rigid frame member 28 and is cemented or otherwise secured thereto. At the lower end of side wall 56 is an inturned flange 57 covering the lower ends of frame member 28 and side wall 26 of reservoir 22. A resilient bead 58 projects laterally outwardly from the lower end of side wall 56 and extends completely around the filter screen. By reason of the resilient character of the side wall 56 and its covering of all exposed metal parts on the forward side of transparent member 20 it provides a suitable cushioning layer adapting the screen to be disposed in face to face contact with a windshield of a vehicle, airplane front window or the like. Bead 58 will form an effective seal with the window.

The inner side wall 59 of housing 55 is cemented or otherwise secured to movable frame member 31 and its inner end has an inturned flange 60 covering the lower end of member 31 and side wall 33 of reservoir 22. Thus by the combination of rigid lower housing 35 and flexible housing 55 the reservoir 22 and all other parts associated with the margins of transparent members 20 and 21 are framed and encased.

To mount the filter screen in windshields or windows of various sizes extensible supporting means are provided along the opposite side of the filter screen. As will be understood from Figs. 1 and 7 rigid frame member 28 on the front side of transparent member 20 is provided with a series of projecting wings which are covered by protective extension 61 of side wall 56 of flexible housing 55. Mounted on an upper pair of projecting wings of frame member 28 are rigid blocks 62 and 63 bored to loosely receive an elongated screw element 64 having at its upper end a flat, thin-edged foot 65 adapted to be inserted between a window pane and its supporting frame. Rotatable between blocks 62 and 63 is a nut 66 threaded on screw element 64. Rotation of nut 66 causes the screw element to extend and retract in a vertical direction. Similar screw element 67 having a similar foot 68 is mounted in the same manner adjacent the lower portion of the screen for vertical adjustment. Because of the extensibility of screw elements 64 and 67 the screen may be adapted to be secured in windows of greater height and area than the overall dimensions of the filter screen.

If desired the reservoir for the filter medium may be of substantial cross-section and compressible around the entire filter screen as illustrated by the embodiment of Fig. 8. There the transparent members 70 and 71 are surrounded by a collapsible reservoir 72 of rubber or other suitable material having margins sealed to the margins of transparent members in the manner previously explained. The reservoir is encased throughout its circumference by a rigid metal frame comprising an outer frame member 73 rigid with transparent member 70 and a deep hollow frame member 74 suitably secured to frame member 73. Instead of employing adjustable spring means at one margin of the screen in association with spring clamps at the other margins, adjustable spring means are in the present embodiment employed at spaced intervals along all margins of the screen. Such means include coil springs 75 adjustable through screw 76 and supported in tubular housing 77 fixed interiorly of frame 74. The springs act against the margin of movable transparent member 71 to urge the latter towards transparent member 70. The various springs are carefully adjusted after the screen is ready for operation to insure parallelism between transparent members 70 and 71. The amount of tension applied on transparent member 71 will be determined by the amount of pressure developed in the filter medium and the force required to move transparent member 71 towards member 70 when the fluid pressure is released to return the filter medium to the reservoir from between the transparent members.

To collapse reservoir 72 a rigid frame-like pressure member 78 is movably mounted in frame 74 to act against reservoir 72 throughout its circumference. Rigid with pressure member 78 at the lower side of the screen is a strong metallic sleeve 79 slidable with a close fit in bore 80 of rotatable actuating knob 81. Outwardly of bore 80 is a threaded bore 82 of reduced cross-section in which is threaded an actuating screw member 83 which extends through sleeve 79 and acts against pressure member 78. Actuating knob 81 is provided at its inner end with a circumferential groove 84 engageable with the margin of an apertured supporting member 85 fixed to frame 74. Rotation of actuating knob 81 causes screw 83 to move the entire pressure member 78 laterally, tilting movement of the pressure member being prevented by reason of sleeve 79.

The inner edge 86 of frame member 74 is spaced sufficiently from transparent member 71 to permit lateral movement of the latter member away from transparent member 70 the amount desired to secure a layer of filter medium of whatever thickness required. Instead of making frame members 73 and 74 of metal rigid molded plastic or other nonmetallic materials may be employed for the framing.

Where cast metal or plastic is employed for the reservoir encasing frame supporting housings may be formed therein for the adjustable spring means acting on the movable transparent member of the filter screen as shown in Fig. 9. There the transparent members 90 and 91 are surrounded throughout their periphery by a reservoir 92 encased in a rigid frame member 93. The side wall of frame member 93 is formed with a thickened portion 94 having at its inner side a socket 95 and seating spring 96 acting against transparent member 91. Outwardly of socket 95 is a threaded bore 97 for adjustment screw 98 acting against spring 96 through disc 99. As in the embodiment of Fig. 8 the adjustable spring means just described will be provided at recurrent intervals around the entire circumference of the screen.

For some purposes it may be desirable to dispense with the individual tensioning springs for the movable transparent member and incorporate the function thereof in the frame of the filter screen. This is illustrated in Fig. 10. There the transparent members 100 and 101 are surrounded by and sealed to the collapsible reservoir 102 as previously described. Encasing the reservoir is a rigid front metallic frame member 103 fixed to transparent member 100 and a hollow frame member 104 of resilient metal. The inner margin 105 of the lower wall 106 of spring frame member 104 engages the parts associated with the margin of transparent member 101 to urge the latter member towards transparent member 100. It is apparent, of course, that spring frame member 104 must be precision stamped or otherwise formed to insure parallelism under all conditions between transparent members 100 and 101. In Fig. 10, as in Fig. 9, the filter medium reservoir is intended to be collapsed throughout its periphery. The pressure member for collapsing the same has not been shown but it will be understood by reference to the foregoing description of Fig. 8.

Fig. 11 illustrates a further form of spring frame designed to tension transparent members towards each other where a portion of the filter medium reservoir is of small cross-section as in the embodiment of Figs. 1 to 7. Transparent members 110 and 111 along one or more of their edges are sealed to a deformable reservoir portion 102 of relatively small cross-section and communicating with an enlarged collapsible reservoir portion extending along one or more of the further edges of the screen. Encasing reservoir portion 112 and engaging with the parts associated with the margins of transparent members 110 and 111 is a channel-shaped frame 113 of spring metal. The collapsible portion of the reservoir may be encased in a spring frame, as in the embodiment of Fig. 10 or may be supported in a rigid frame provided with a series of adjustable springs as in the embodiments of Figs. 1 to 7 and Fig. 8.

In the various embodiments so far described the filter screens are adjusted by varying the pressure applied to the filter medium reservoir by suitable actuating means and providing spring means for urging the transparent members towards each other. It is also possible to apply a continuous pressure to the filter medium reservoir and to adjust the screen by regulating the spacing between the transparent members positively. Such an arrangement is illustrated in Fig. 12. As in the embodiment of Fig. 8 transparent members 120 and 121 are surrounded on all sides and sealed to a collapsible reservoir 123. Encasing the reservoir and rigid with transparent member 120 is a rigid frame comprising members 124 and 125. Mounted in frame member 125 along all edges of the screen are a series of pressure bars or plates 126 engageable with reservoir 123 and constantly tending to collapse the same through force applied thereto by relatively strong, expansion coil springs 127 which may or may not be provided with screw or other tension adjusting members (not shown), as desired. Springs 127, two or more of which will be provided for the pressure bar 126 along each edge of the filter screen, must be strong enough to force filter medium from reservoir 123 between transparent members 120 and 121 in the amount necessary to provide a fluid filter layer of the maximum thickness required.

Adjustment of the screen is accomplished by actuating means serving to regulate the position of movable transparent member 121 relative to stationary transparent member 120. Various types of means which will serve such purpose and insure parallelism between the transparent members may be employed. The form of such means shown in Figs. 12 and 13 includes a rigid frame 128 rigid and movable with transparent member 121 provided with a series of horizontally inclined wedge surfaces 129 and 130. Coactive with member 128 is a complementary movable actuating frame 131 having wedge surfaces interfitting with wedge surfaces 129 and 130. Actuating frame member 131 is supported for horizontal movement within frame member 125 in a fixed plane by means of stationary guides within the frame at all sides thereof such as blocks 132 and 133. Horizontal movement of frame member 131 in sliding engagement with blocks 132 and 133 to the left forces frame member 128 and transparent member 121 towards transparent member 120. Movement of frame member 131 to the righthand limit of the wedge surfaces produces maximum spacing between the transparent members. Such movement is effected by a reciprocating lever arm 134 having a ball and socket connection 135, 136 with actuating frame member 131 and fulcruming in a resilient bushing 137 of rubber or other suitable material secured to hollow frame 125.

When actuating frame member 131 is moved to the left by lever arm 134 the pressure produced on reservoir 123 by springs 127 will force filter fluid between transparent members 120 and 121. Movement of actuating frame member 131 to the right will force filter fluid from the space between the transparent members back into reservoir 123 against the pressure exerted on the reservoir by pressure members 127. This form of the invention requires no tensioning springs in association with transparent member 121 since such members are maintained in parallelism and one member is movable towards the other through coacting wedge frame members 128 and 131.

It may be said that the actuating means for developing fluid pressure and for adjusting the transparent members in the present form are the reverse of the actuating means employed in the previously described embodiments of the invention. Here the transparent members are adjusted through positive actuating means and spring means are employed to develop pressure on the filter fluid. In the earlier forms of the invention the transparent members are adjusted by spring means and positive means are employed to develop pressure in the filter medium.

The further embodiment of the invention shown in Fig. 14 employs the same operating principle of the embodiment of Figs. 12 and 13 in a circular form of filter screen and with some modification in certain of the operating parts. The circular transparent members 140 and 141 of glass or other suitable rigid transparent material are surrounded by an annular collapsible reservoir 142 for filter medium. One bifurcated margin of reservoir 142 is secured in sealing engagement with the beveled edge of transparent member 140 and to a rigid annular frame member 143 by a beveled clamping ring. The bifurcated opposite margin of reservoir 142 is secured in sealing engagement with the bevel edge of transparent member 141 and supporting frame member 145 by a beveled clamping ring 146. Secured to front frame member 143 is a hollow annular frame member 147 encasing reservoir 142.

Compression of reservoir 142 to force filter fluid between transparent members 140 and 141 is effected by a strong elastic annular band 148 of rubber or equivalent material. Such band may be endless or of adjustable length and is tightly stretched about the outer periphery of reservoir 142 to be capable of contracting the reservoir sufficiently to force filter fluid between the transparent members to the maximum layer thickness desired.

As in the form of the invention shown in Figs.

12 and 13 adjustment of the spacing of transparent members 140 and 141 is effected through positive actuating means. Such means include an actuating ring 149 mounted for rotation interiorly of inner wall 150 of hollow frame member 147. Secured to and projecting outwardly from ring 149 in a common circumferential plane are three or more equally spaced control fingers or pins 151 which slidably engage annular frame member 145 of movable transparent member 141. The opposite sides of pins 151 engage inclined cam or wedge surfaces 152 formed around the inner periphery of inner wall 150 of hollow frame member 147. Rotation of actuating ring 149 in a clockwise direction causes pins 151 to ride along cam surfaces 152 in a manner to shift ring 149 laterally inward so that frame 145 and transparent member 141 are moved towards transparent member 140. Rotation of ring 149 in a counterclockwise direction permits the ring to shift outwardly a distance equal to the maximum depth of cam surfaces 152.

The contractual force of elastic band 148 on reservoir 142 forces filter fluid from the reservoir between the transparent members, and forces the members apart and moves actuating ring 149 outwardly a distance determined by the position of pins 151 on cam surfaces 152. Rotation of ring 149 moves the transparent members together and forces the filter fluid from the space between the members back into reservoir 142 against the contractual forces of band 148.

The filter medium has been omitted from the drawings for purposes of clarity but it will be understood that the same fills the reservoirs in all embodiments. The filter medium may be selected from a wide range of materials depending upon the function to which the screen is to be put. Thus various colored gases may be employed. Preferably, however, a colored liquid is used, of a type that will not absorb gas which might be evolved as gas bubbles when the screen is in use. In some cases water is satisfactory, but to avoid adverse effects at low temperature it is better to use ethyl alcohol, glycol, glycerine, other alcohols, or benzol, or a mixture of one or more of these and water. Hydrocarbon derivatives such as paraffin can also be employed as well as many other types of liquids. Dissolved or fine suspended coloring matter may be employed in the filter liquid. If the screen is to be used for filtering light selection of the coloring matter will be determined by whether it is desired to vary the intensity of transmission over all the spectrum, or to particularly control the transmission of selected portions of the spectrum. Blue or other aniline dyes will be found suitable for many purposes.

It is also desirable to include on the filter medium a preservative or sterilizing agent which will prevent formation of organic or other deposits in the reservoir and on the transparent members which might interfere with clarity of the filter medium. Phenol can be employed for this purpose.

One example of filter medium particularly suitable for glareshields includes a mixture of 25% water, 25% ethyl alcohol, 50% glycerine, 2 grams phenol per liter and aniline blue in amount to give a comparatively concentrated solution.

The adjustable filter screen of the invention is capable of adaptation for a variety of purposes as a light filter. It may be removably mounted in association with windows of motor and railway vehicles, airplanes and ships. It may also be installed permanently as a substitute for a window in such various forms of transportation and in buildings. It also may be employed singly or in a series containing different colored filter mediums to produce colored lighting effects for stage lighting and other purposes. It is equally useful for use in light measuring and other scientific optical apparatus and for photographic purposes. Again, it may be employed, preferably in its circular forms, as a glare screen in conjunction with gun sights and airplane bomb sights.

The invention is not limited to the filtration of visible light but can be employed with appropriate absorbent or filtering media in conjunction with heating or infra-red and ultra-violet radiations beyond the visible light spectrum, for X-rays, gamma rays and cosmic rays. Likewise, it can be employed to determine the intensity of corpuscular radiant energy or of ionizing particles such as alpha, beta, deuteronic and protonic particles and other types of particles of atomic structure.

It will be understood that the shape of my adjustable filter screen can be determined at will, that the forms of supporting frames shown are merely illustrative and that the specific means for adjusting the spacing of the transparent members and for developing pressure for forcing the filter fluid from the surrounding reservoir into the screen are capable of a wide range of modification and equivalency. Accordingly, the scope of the invention is to be adjudged in accordance with the appended claims.

I claim:

1. A variable filter screen comprising a pair of rigid, opposing parallel transparent members laterally movable to and from each other, a deformable closed flexible thin-walled reservoir for filter fluid extending around the transparent members outwardly of the margins of the transparent members and having laterally separable opposing margins in fluid-tight connection with the opposing margins of the transparent members, a hollow frame extending around the transparent members and encasing the reservoir, the outer surface of the thin wall of the reservoir being free for flexing movement relative to the interior wall of the frame, and pressure means operative to compress at least a portion of the reservoir within the frame and adapted to force filter fluid from all areas of the reservoir between the transparent members.

2. A variable filter screen comprising a pair of rigid, opposing parallel transparent members laterally movable to and from each other, a deformable closed flexible thin-walled reservoir for filter fluid extending around the transparent members outwardly of the margins of the transparent members and having laterally separable margins in fluid-tight connection with the opposing margins of the transparent members, a hollow frame rigid with one of the transparent members extending around the transparent members and encasing the reservoir, the outer surface of the thin wall of the reservoir being free for flexing movement relative to the interior wall of the frame, and pressure means operative to compress the reservoir in the frame and adapted to force filter fluid from the reservoir between the transparent members.

3. A variable filter screen comprising a pair of rigid, opposing parallel transparent members laterally movable to and from each other, a deformable closed flexible thin-walled reservoir for filter fluid extending around the transparent members outwardly of the margins of the transparent members and having laterally separable margins in fluid-tight connection with the opposing margins of the transparent members, a hollow frame extending around the transparent members and encasing the reservoir, said frame for at least a portion of its circumference having laterally separable opposing flexible side walls arranged to move to and from each other with lateral movement of the transparent members, and pressure means for compressing the reservoir and adapted to force fluid between the transparent members.

4. A variable filter screen comprising a pair of rigid, opposing parallel transparent members laterally movable to and from each other, a deformable flexible thin-walled reservoir for filter fluid extending around the transparent members outwardly of the margins of the transparent members and having laterally separable margins in fluid-tight connection with the opposing margins of the transparent members, a hollow metal frame surrounding the transparent members and encasing the reservoir and in which the thin wall of the reservoir is capable of independent movement, and pressure means for compressing the reservoir within the frame and adapted to force filter fluid from the reservoir between the transparent members.

5. A variable filter screen comprising a pair of rigid, opposing parallel transparent members laterally movable to and from each other, a deformable flexible thin-walled reservoir for filter fluid extending around the transparent members outwardly of the margins of the transparent members and having laterally separable margins in fluid-tight connection with the opposing margins of the transparent members, a hollow spring metal frame surrounding transparent members, said frame encasing the reservoir and the margins of the transparent members and yieldingly urging said transparent members together, and pressure means operative to force filter fluid from the reservoir between the transparent members.

6. A variable filter screen comprising a pair of rigid, opposing parallel transparent members laterally movable to and from each other, a deformable flexible thin-walled reservoir for filter fluid extending around the transparent members outwardly of the margins of the transparent members and having laterally separable margins in fluid-tight connection with the opposing margins of the transparent members, said reservoir having an enlarged cross-section and capacity along at least one side of the transparent members and being of smaller cross-section and capacity along the remaining sides of the transparent members, a rigid hollow frame portion secured to one of the transparent members encasing the portion of the reservoir of enlarged cross-section, a flexible hollow frame portion encasing the portion of the reservoir of smaller cross-section, and pressure means for compressing the portion of the reservoir of enlarged cross-section within the rigid frame portion.

7. A variable filter screen comprising a pair of rigid, opposing parallel transparent members laterally movable to and from each other, a deformable flexible thin-walled reservoir for filter fluid extending around the transparent members outwardly of the margins of the transparent members and having laterally separable margins in fluid-tight connection with the opposing margins of the transparent members, a rigid supporting frame secured to one of the transparent members, means supporting the other transparent member for lateral movement relative to the frame and to said first transparent member, extensible anchoring means movably mounted on the frame for projection outwardly beyond opposite side margins of the transparent members and adapted to engage a supporting frame of larger area than the transparent members, and pressure means for compressing the reservoir and adapted to force filter fluid from the reservoir between the transparent members.

8. A variable filter screen comprising a pair of rigid, opposing parallel transparent members laterally movable to and from each other, a deformable flexible thin-walled reservoir for filter fluid extending around the transparent members outwardly of the margins of the transparent members and having laterally separable margins in fluid-tight connection with the opposing margins of the transparent members, a cushioning frame member of resilient material secured to the margins of one of the transparent members on the exposed face thereof adapted to rest against a flat surface, means supporting the other transparent member for lateral movement relative to the first frame member and said cushioning frame, and pressure means adapted to force filter fluid from the reservoir between the transparent members.

9. A variable filter screen comprising a pair of rigid, opposing parallel transparent members laterally movable to and from each other, spring means located on opposite side margins of the transparent members urging said members towards each other, means for adjusting the relative tension of spring means on said opposite side margins and adapted to secure parallelism of the transparent members, a closed reservoir adapted to contain a filter fluid and having laterally separable opposing margins in fluid-tight connection with opposing margins of the respective transparent members, and pressure means operative to force filter fluid from the reservoir between the transparent members against the opposition of the spring means.

10. A variable filter screen comprising a pair of rigid, opposing parallel transparent members laterally movable to and from each other, a frame rigid with one of the transparent members, adjustable spring means mounted on the frame and engageable with the second transparent member to yieldingly urge said members toward each other, a closed reservoir adapted to contain a filter fluid and having laterally separable opposing margins in fluid-tight connection with opposing margins of the respective transparent members, and pressure means operative to force filter fluid from the reservoir between the transparent members against the opposition of the spring means.

11. A variable filter screen comprising a pair of rigid, opposing parallel transparent members laterally movable to and from each other, a series of spring clamps embracing and engageable with opposing margins of the transparent members at recurrent points and yieldingly urging the transparent members towards each other, adjustable spring means engageable with the margin of one of the transparent members and yieldably urging the transparent members towards each other, means for adjusting said latter spring means so as to secure parallelism between the transparent members, a closed reservoir adapted to contain a filter fluid and having laterally separable opposing margins in fluid-tight connection with opposing margins of the respective transparent members, and pressure means operative to force filter fluid from the reservoir between the transparent members against the opposition of the spring means.

12. A variable filter screen comprising a pair of rigid, opposing parallel transparent members laterally movable to and from each other, a deformable closed flexible thin-walled reservoir for filter fluid extending around the transparent members outwardly of the margins of the transparent members having laterally separable opposing margins in fluid-tight connection with opposing margins of the transparent members, a rigid hollow frame surrounding the transparent members and encasing the reservoir, means mounted within the frame operative to compress the reservoir on all sides of the transparent members, and means for laterally moving the transparent members together from spaced relation.

13. A variable filter screen comprising a pair of rigid, opposing parallel transparent members laterally movable to and from each other, a deformable closed flexible thin-walled reservoir for filter fluid extending around the transparent members outwardly of the margins of the transparent members having laterally separable opposing margins in fluid-tight connection with opposing margins of the transparent members, a rigid hollow frame surrounding the transparent members and encasing the reservoir, resilient pressure means mounted within the frame operative to compress the reservoir and adapted to force fluid from the reservoir between the transparent members, and means operable to laterally move the transparent members together against the fluid pressure developed by the resilient pressure means.

14. A variable filter screen comprising a pair of rigid, opposing parallel transparent members laterally movable to and from each other, a deformable closed flexible thin-walled reservoir for filter fluid extending around the transparent members outwardly of the margins of the transparent members having laterally separable opposing margins in fluid-tight connection with opposing margins of the transparent members, a rigid hollow frame surrounding the transparent members and encasing the reservoir, resilient pressure means mounted within the frame outwardly of the reservoir and operative to contract the reservoir circumferentially for forcing filter fluid from the reservoir between the transparent members, and means operable to laterally move the transparent members together against the fluid pressure developed by the resilient pressure means.

15. A variable filter screen comprising a pair of rigid, opposing parallel transparent members laterally movable to and from each other, a deformable closed flexible thin-walled reservoir for filter fluid extending around the transparent members outwardly of the margins of the transparent members having laterally separable opposing margins in fluid-tight connection with opposing margins of the transparent members, a rigid hollow frame surrounding the transparent members and encasing the reservoir, resilient pressure means mounted within the frame operative to compress the reservoir and adapted to force filter fluid from the reservoir between the transparent members, and cam operated means mounted in the frame coactive with one of the transparent members to move the same laterally towards the other transparent member against the fluid pressure developed by the resilient fluid pressure means.

16. A variable filter screen comprising a pair of rigid, opposing parallel transparent members laterally movable to and from each other, a deformable closed flexible thin-walled reservoir for filter fluid extending around the transparent members outwardly of the margins of the transparent members having laterally separable opposing margins in fluid-tight connection with opposing margins of the transparent members, resilient pressure means constantly tending to compress the reservoir adapted to force filter fluid from the reservoir between the transparent members and laterally move said members apart, and means coactive with the transparent members and operative to regulate their lateral position relative to each other.

17. A variable filter screen comprising a pair of rigid, opposing parallel transparent members laterally movable to and from each other, a deformable closed flexible thin-walled reservoir for filter fluid extending around the transparent members outwardly of the margins of the transparent members having laterally separable opposing margins in fluid-tight connection with opposing margins of the transparent members, resilient pressure means surrounding the reservoir constantly tending to contract the reservoir circumferentially adapted to force filter fluid from the reservoir between the transparent members and laterally move the transparent members apart and means operative to laterally move the transparent members together and adapted to cause the filter fluid between the transparent members to flow into the reservoir and expand the reservoir against the pressure of the resilient pressure means.

18. A variable filter screen comprising a pair of rigid, opposing parallel transparent members of circular form, movable laterally to and from each other, an annular deformable closed flexible thin-walled reservoir adapted to contain filter fluid surrounding said circular transparent members outwardly of the margins of the transparent members and having laterally separable margins in fluid-tight connection with the opposing margins of the transparent members, an annular hollow frame secured around the margin of one of the transparent members and encasing the reservoir, means operative to compress the reservoir within the frame and adapted to force filter fluid between the transparent members, and means on the frame operable to laterally move the transparent members towards each other.

19. A variable screen comprising a pair of rigid, opposing parallel transparent members of circular form, movable laterally to and from each other, an annular deformable closed flexible thin-walled reservoir adapted to contain filter fluid surrounding said circular transparent members outwardly of the margins of the transparent members and having laterally separable margins in fluid-tight connection with the opposing margins of the transparent members, an annular hollow frame secured around the margin of one of the transparent members and encasing the reservoir, resilient pressure means within the casing adapted to compress the reservoir and force filter fluid between the transparent members, a ring mounted for rotation on the frame member and coactive with the second transparent member and actuating means responsive to rotation of the ring to move said ring laterally and move the second transparent member relative to the first transparent member.

20. An adjustable filter screen comprising a pair of rigid, opposing parallel transparent members laterally movable to and from each other, spring means adapted to move the transparent members together from spaced relation, a deformable closed reservoir for filter fluid extending around the transparent members and having laterally separable opposing margins, a rigid stationary frame, a clamping member clamping the margin of one of the transparent members and one of the margins of the reservoir in sealing relation and securing them to the frame, a movable frame, a second clamping member clamping the margin of the second transparent member in sealing relation and securing them to said movable frame, a housing encasing the reservoir portion along one edge of the transparent members and secured to the stationary frame, pressure means supported by the housing operable to compress the reservoir portion in the housing and adapted to force filter fluid from all areas of the reservoir between the transparent members, and spring means.

LUIS RODRIGUEZ APARICIO.

REFERENCES CITED

The following references are of record in the file of this patent:

UNITED STATES PATENTS

| Number | Name | Date |
|---|---|---|
| 1,780,773 | Wearham | Nov. 4, 1930 |
| 1,782,328 | Wearham | Nov. 18, 1930 |
| 1,870,284 | Drake | Aug. 9, 1932 |
| 2,220,861 | Blodgett | Nov. 5, 1940 |
| 2,338,497 | Dimmick | Jan. 4, 1944 |
| 2,369,741 | Jones et al. | Feb. 20, 1945 |
| 2,474,712 | Aparicio | June 28, 1949 |

FOREIGN PATENTS

| Number | Country | Date |
|---|---|---|
| 8,206 | Australia | of 1932 |